United States Patent [19]
Nadel et al.

[11] Patent Number: 5,577,828
[45] Date of Patent: Nov. 26, 1996

[54] LIGHT ILLUMINATING ASSEMBLIES FOR WEARING APPAREL

[76] Inventors: Craig P. Nadel, 201 Wingate Rd., Parsippany, N.J. 07054; Dietmar Nagel, 11 South Rd., Chester, N.J. 07930

[21] Appl. No.: 331,726

[22] Filed: Oct. 31, 1994

[51] Int. Cl.⁶ ..................... F21L 15/08
[52] U.S. Cl. ............. 362/103; 362/31; 362/276; 362/802; 362/806; 36/137
[58] Field of Search .............. 36/137; 362/26, 362/31, 103, 105, 106, 108, 330, 806, 276, 802, 800

[56] References Cited

U.S. PATENT DOCUMENTS

| | | | |
|---|---|---|---|
| 4,570,206 | 2/1986 | Deutsch | 362/103 |
| 4,709,307 | 11/1987 | Branom | 362/806 X |
| 4,823,240 | 4/1989 | Shenker | 362/103 |
| 5,113,325 | 5/1992 | Eisenbraun | 362/806 X |
| 5,371,662 | 12/1994 | Shen-Ko | 362/103 X |

*Primary Examiner*—Stephen F. Husar
*Attorney, Agent, or Firm*—Cohen, Pontani, Lieberman, Pavane

[57] ABSTRACT

An article of wearing apparel defines a curved mounting surface when worn and includes a decorative, illuminatable assembly affixed over the mounting surface. The decorative assembly includes a soft, flexible panel member having an upper surface, a lower surface, and a peripheral edge surface. The flexible panel member is sufficiently flexible to conform to the curvature of the mounting surface by hand pressure alone and is substantially comprised of a transparent or a translucent material. The flexible panel member defines a cavity in communication with the peripheral edge surface, which cavity is dimensioned and arranged to receive at least one light emitting element. The lower surface of the panel member causes a decorative pattern of refractive grooves dimensioned and arranged to reflect light propagating through the panel member in a plane disposed between its upper and lower surfaces.

16 Claims, 2 Drawing Sheets

5,577,828

LIGHT ILLUMINATING ASSEMBLIES FOR WEARING APPAREL

BACKGROUND OF THE INVENTION

1. Field of the Invention

The present invention relates, in general, to illuminated articles and, more particularly, to a decorative assembly for illuminating footwear, garments, hats, and other articles of wearing apparel.

2. Description of the Prior Art

The use of light illuminating devices and assemblies having one or more light emitting elements such as Light Emitting Diode (LED) modules for illuminating a decoration or a design applied, painted or printed on wearing apparel, garments, hats or other accessories is well known. Accordingly, there exist various prior art patents which show such light illuminating devices and assemblies as well as various ways of affixing the LED modules into assembled position to accomplish the desired coaction with such decorations or designs. See, for example, U.S. Pat. Nos. 4,570,206; 4,599,682; 4,709,307; 4,823,240; 4,480,293; 5,113,325; and 5,113,329.

There are also a number of references in the patent literature that depict various methods for incorporating light emitting elements and batteries to energize them into various portions of a shoe in order, e.g., to provide a visually distinctive article of footwear. Heretofore, the light emitting device, as well as the batteries, have been incorporated into the heel portion of the sole of a dress or sports shoe. The rugged, substantially non-resilient construction of the heel provides a sufficient volume to receive and protect the light and battery. When configured with a transparent or translucent portion comprised of a plastic material, such as acrylic resin, plexiglas and the like, the heel can serve not only as a support for the person wearing the shoe, but also as a light conductor or spreader. It has also been proposed to attach a transparent (or translucent), rigid panel member having refractive facets defined therein to the heel region of an athletic shoe to create striking illuminated patterns.

The incorporation of a light-emitting, decorative device into an athletic shoe is complicated, however, by the specific qualities of resiliency, flexibility, and support required of such a shoe during athletic activities. An improperly designed athletic shoe that does not provide the desired degree of support, protection, and comfort for the athlete is unacceptable. Thus, the use of transparent or translucent panel members of the rigid type described above has been limited to the heel region of athletic shoes, where the rigidity of the decorative panel member does not cause discomfort to the wearer. Moreover, rigid panel members are unsuitable for use with articles of wearing apparel such as garments, hats, and the like which may contort or bend many times while the article is being worn.

SUMMARY OF THE INVENTION

Accordingly, it is an object of the present invention to provide a decorative, illuminated display device which may be attached to a wide variety of wearing apparel articles without causing discomfort to the wearer.

In accordance with one aspect of the present invention, an article of wearing apparel defines a curved mounting surface when worn and includes a decorative, illuminatable assembly affixed over the mounting surface. The decorative assembly includes a soft, flexible panel member having an upper surface, a lower surface, and a peripheral edge surface. The flexible panel member is sufficiently flexible to conform to the curvature of the mounting surface by hand pressure alone and is substantially comprised of a transparent or a translucent material. The flexible panel member defines a cavity in communication with the peripheral edge surface, which cavity is dimensioned and arranged to receive at least one light emitting element. The lower surface of the panel member defines a decorative pattern of refractive grooves dimensioned and arranged to reflect light propagating in and through a plane disposed between the upper and lower surfaces.

Because the decorative panel member is flexible, it may be secured to apparel articles over mounting surfaces that were not previously accessible to the rigidly configured panel members of the prior art. In an athletic shoe, for example, the soft panel member of the present invention may be placed over the toe portion without causing discomfort to the wearer during walking or running. Moreover, the need for molds having complex, arcuate contours is obviated.

The decorative assembly further includes at least one light emitting element positioned within the panel member cavity. The light emitting element may be configured with substantially planar, opposed exterior surfaces and a peripheral exterior edge surface contiguous therewith such that the peripheral edge surface of the light emitting element directs substantially all emitted light along a propagation plane disposed between the upper and lower surfaces. The decorative assembly further includes a power source and switching means for electrically interconnecting the power source to the light emitting element. The decorative assembly of the present invention may be secured to such articles as athletic shoes, garments, and hats. Unique adaptations are possible for use of the decorative assembly on each such article. When secured to an athletic shoe, for example, the switching means may be configured as an acceleration-sensitive spring switch operative to produce an irregularly periodic contact closure between the power source and light emitting element during movement of the shoe. Thus with this aspect of the invention, the light will not be continuously illuminated but, rather, only intermittently during movements of the shoe.

Other objects and features of the present invention will become apparent from the following detailed description considered in conjunction with the accompanying drawings. It is to be understood however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE INVENTION

Figure 1:
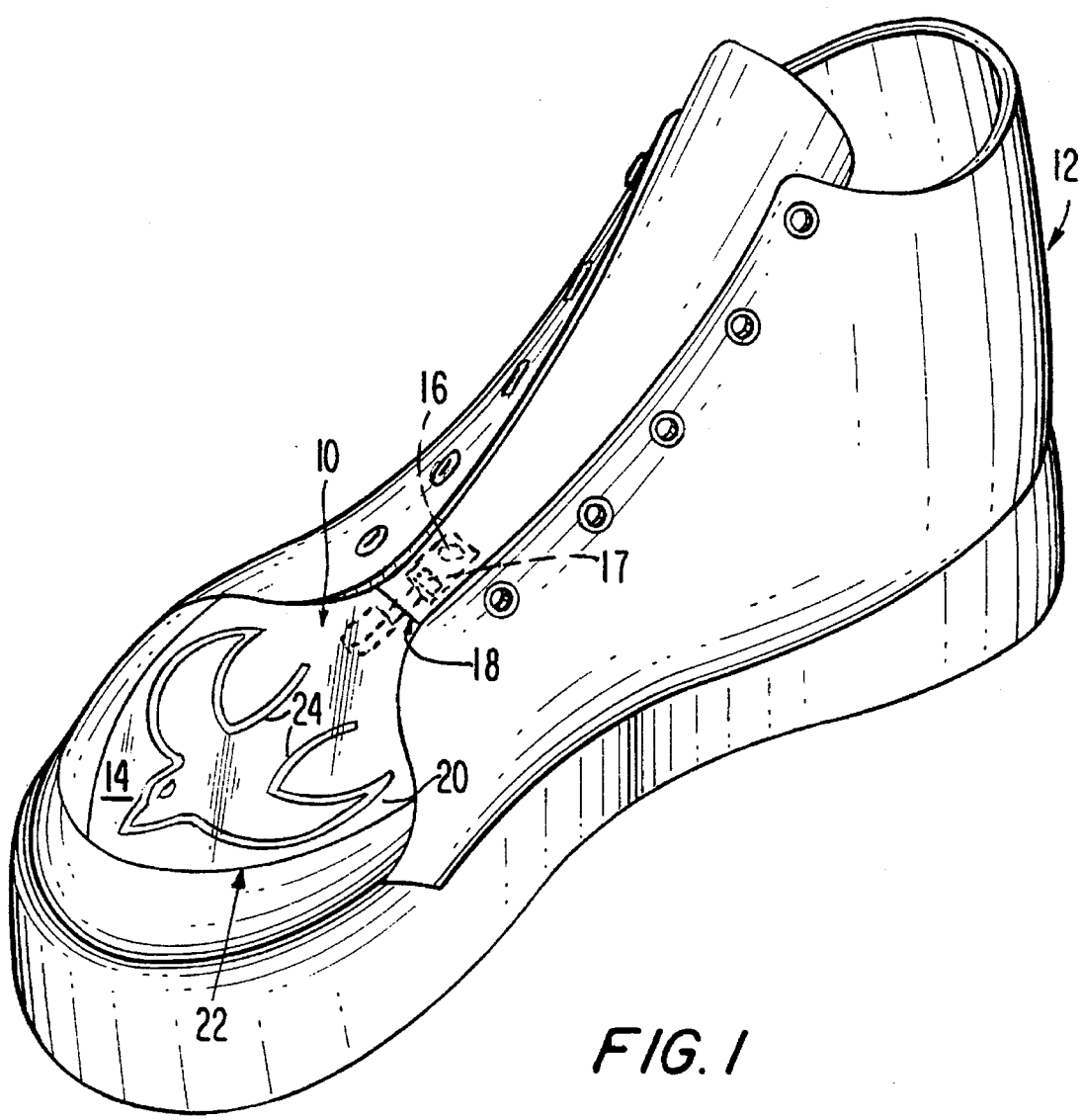
FIG. 1 is an elevated perspective view of an article of wearing apparel incorporating a decorative assembly constructed in accordance with an illustrative embodiment of the present invention secured thereto.

With initial reference to FIG. 1, there is shown a decorative, illuminated device 10 constructed in accordance with an illustrative embodiment of the present invention and secured to an article of wearing apparel such, by way of particular example, as an athletic shoe 12. As seen, device 10 includes a transparent or translucent, flexible panel member 14, a power source 16, e.g., a battery, electrical circuitry 17 that includes a switch (not shown) such, for example, as a movement sensitive switch that is operatively responsive to movement of the wearer of the apparel article, and a light-emitting device 18, such as a light-emitting diode, for directing light into panel member 14.

Although the illustrative embodiment of the device 10 depicted in FIG. 1 and described in detail herein is shown secured to an athletic shoe, it is contemplated that the inventive decorative device may be utilized to flexibly adorn the surface of any article of apparel, particularly those surfaces that are defined by sections of flexible material and that are likely to exhibit a compound curved contour which changes often during wear or use. Thus, when used herein, the term wearing apparel is intended to denote any form of garment, hat, footwear, or other accessory on which a flexible panel defining a decorative pattern or a design can be affixed and on which light emitting elements may be affixed in accordance with the present invention for the purposes of coacting with, illuminating and enhancing such a decorative flexible panel.

With continued reference to FIG. 1, it will be seen that transparent or translucent panel member 14 may, by way of example, be positioned over the toe portion 22 of athletic shoe 12 and secured in position relative thereto. As will be readily appreciated by those skilled in the art, the use of a rigid decorative panel member in such a location would seriously reduce and impede the overall flexibility of the shoe 12, thereby causing discomfort to the wearer and limiting the range of movement. In accordance with the present invention, however, this problem is avoided because decorative panel member 14 is also flexible. As such, it can be placed at almost any location on an article of apparel without restricting the wearer's movements or causing discomfort. Moreover, the decorative panel member 14 may be easily caused to conform to a curved surface 20 defined on or by the apparel article. Throughout this specification when it is stated that a plastic is sufficiently flexible to conform to a curved surface, it will also be understood that there is sufficient flexibility in the plastic to conform and affix the decorative panel to the surface by hand using a suitable attachment means as hereinafter described.

Figure 2:
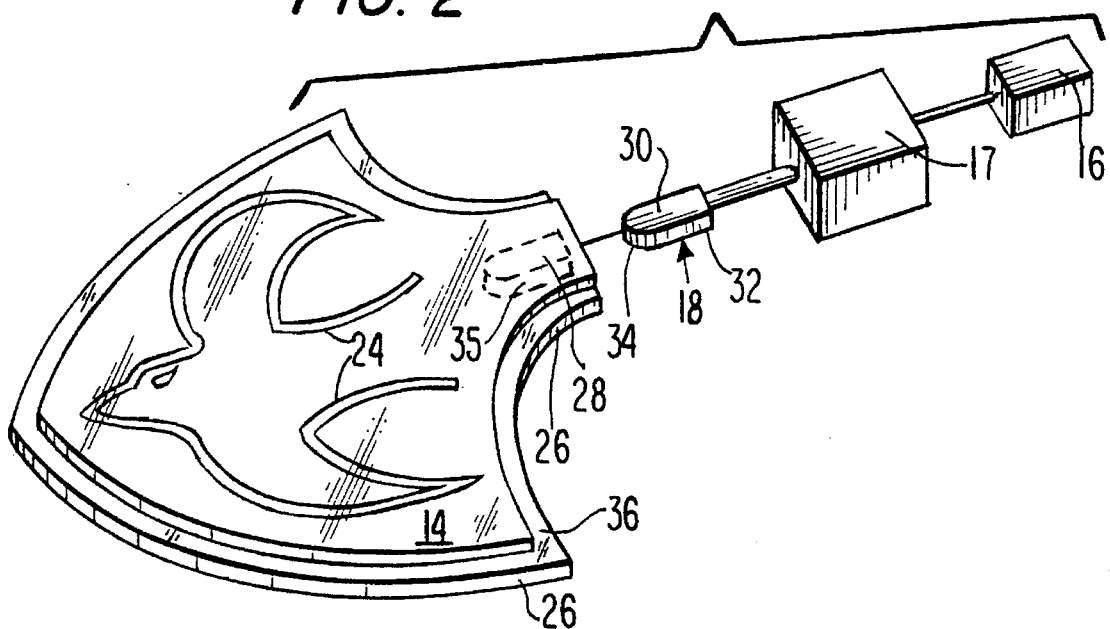
FIG. 2 is an exploded view of a decorative assembly constructed in accordance with the present invention and showing, inter alia, a flexible, decorative panel member in a non-affixed condition.

As more clearly shown in FIG. 2, decorative panel member 14 is preferably adorned with a striking pattern of prismatic grooves or refractive facets 24 defined on the bottom surface thereof. As will be readily apparent to those skilled in the art, light rays emitted from light emitting device 18 strike the interior of the transparent or translucent panel member 14 and refract in accordance with Snell's law as they pass therethrough. If a light ray strikes one prism face at any angle less than the critical angle for total internal reflection, it reflects by total internal reflection and heads for the other prism face of the same prismatic element. If thereby re-reflected by total internal reflection, the light ray returns to the interior of panel 14 for further propagation. The pattern of grooves thus defines an attractive, brightly illuminated pattern.

To facilitate the entry of light into the body thereof, the exterior peripheral edge surface 26 of decorative panel member 14 preferably defines an opening to a bore, cavity or channel 28 dimensioned and arranged to accommodate at least a substantial portion of light emitting element 18. To maximize the amount of light available for internal reflection and refraction, the channel 28 preferably has a width, length, and depth sufficient to accommodate the light emitting element 18 in its entirety. To further maximize the amount of light delivered to decorative panel 14, the light emitting element 18 itself may be specially configured to emit light along a predetermined portion of its surface. For example, in FIG. 2, the light emitting element is configured as a light emitting diode having substantially planar upper and lower surfaces 30, 32 and an elongated, peripheral edge surface 34. Light emission by element 18 is principally confined to the peripheral edge surface 34. As such, the majority of light operatively supplied by light emitting element 18 enters panel member 14 through surface 35 of channel 28. As will be readily appreciated by those skilled in the art, light entering the panel 14 in this manner will propagate along a plane disposed between the upper and lower surfaces of decorative panel 14.

The exterior peripheral edge surface 26 of decorative panel member 14 may, to enhance transmission efficiency, be coated or otherwise covered with a layer or film of reflective material (not shown). Thus, light that may be transmitted through the decorative panel 14, which would otherwise be lost, may be diffused or reflected back into the interior of the decorative panel from the reflective surface and thereby retained.

Decorative panel 14 may be fabricated from any suitable material possessing the desired characteristics of flexibility and transparency or translucency and may, for example, be formed by injection molding, although extrusion molding, compression molding, or other suitable forming processes can also be used. Representative examples of materials suitable for use in the decorative panel include poly(ethylene-co-vinyl acetate) (EVA), plasticized poly vinyl chloride (PVC), silicone, and soft thermosetting or thermoplastic plastic materials. Depending on the decorative effect that is desired, the decorative panel member 14 may also be formed from a plastic that is filled or mixed with a colored pigment.

Any suitable means for attaching the flexible panel member 14 to an article of wearing apparel may be employed. In the illustrative embodiment of FIG. 1, panel member 14 is mounted over the flexible toe portion 22 of athletic shoe 12. Where the mounting surface defined by the wearing apparel is also soft and flexible, flexible panel member 14 may, for example, be affixed by stitching. Thus, as shown in FIG. 2, flexible panel may be formed with grooved or reduced thickness peripheral regions 36 that are easily penetrable by a stitching needle during the affixation process. During fabrication of an athletic shoe, for example, fabric or material surrounding the toe region 22 can be positioned in an overlapping manner over the peripheral regions 36 and stitched, along with the panel member 14, to an underlying surface portion (not shown) of the shoe upper. Alternatively, a suitable bonding agent or adhesive may be employed between selected regions of the lower surface of panel member 14, as for example along the peripheral edge regions thereof, and the supporting surface of the wearing apparel article. If desired, the panel member may be supplied with a pressure-sensitive adhesive already applied thereto. Commercially available pressure-sensitive adhesives that are useful for this purpose are well known.

The use of LED's produces a bright display in selectable colors which requires much less energy than would the use of incandescent illumination, thus giving longer battery life. Since LEDs require less power than other sources, the battery and other components may be of smaller size and cost. Such smaller size is of considerable importance in wearing apparel. LEDs also provide a relatively high intensity relative to their power requirements. It should, however, be understood that the light emitting element or elements 18 used in accordance with the teachings of the present invention may also be implemented as incandescent lamps and optical fibers and the like.

To reduce wiring complexity, it is generally desirable to locate the power source 16 and electrical circuitry 17 as close as possible to panel member 14. In the illustrative embodiment depicted in FIG. 1, it is currently believed that the tongue of athletic shoe presents the best place for the mounting of such components since wiring to the light emitting element will be least complicated. However, it will be readily appreciated that the power source and electrical circuitry need not be in close proximity to the decorative panel 14 and, in fact, may be positioned at any suitable location on or within an apparel article, as for example in the heel of the athletic shoe 12.

Figure 3:
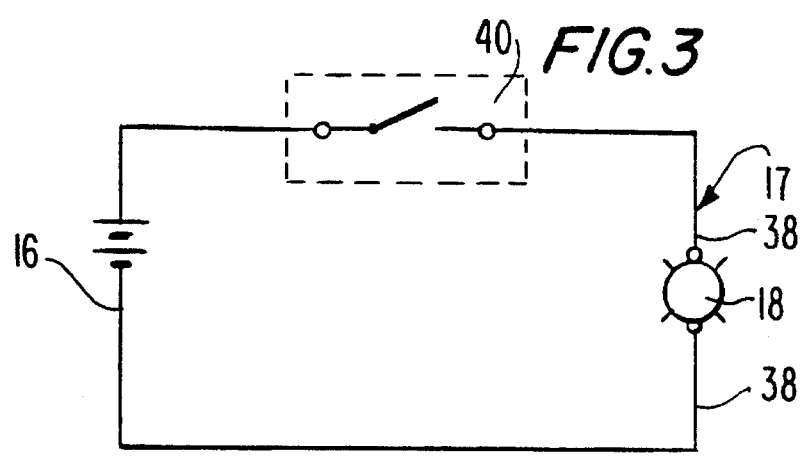
FIG. 3 is a circuit schematic depicting an illustrative scheme for controlling the illumination of the decorative panel member depicted in FIG. 2.

Shown in FIG. 3 is a partial schematic diagram of an illustrative electrical lighting circuit 17 that may be utilized to Illuminate the prismatic groove pattern of display panel 24. As seen in the schematic, the circuit is coupled to power source 16 and includes conductive connecting means 38 for electrically connecting the power source to the light emitting element 18, and switch means 40 for selectively connecting the power source to the light emitting element in the desired fashion and to prevent power consumption by the light emitting element during periods of inactivity or non-use of the wearing apparel article. It should be noted that any suitable switch configuration may be utilized with the electrical circuit 17 of the present invention.

Figure 4:
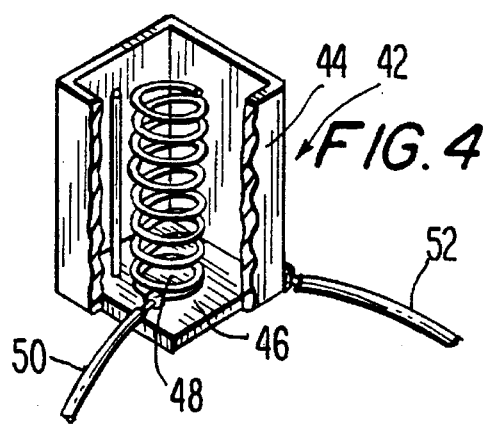
FIG. 4 is a partially broken-away view of a motion-sensing switching means utilized in accordance with an illustrative embodiment of the present invention.

In the illustrative embodiment of circuit 17 adapted for use with an article of footwear, the switch means 40 is chosen to be operatively responsive to close when the wearer's foot is moved, and to open and remain open when the wearer's foot is stationary. To this end, switch means 40 includes an acceleration-sensitive spring switch 42 (FIG. 4) that produces a contact closure when the wearing apparel article is subjected to acceleration. Essentially, switch device 42 includes a conductive housing 44 that is rigidly connected to a circuit substrate 46, and a very fine conductive helical spring 48 that is also cantilevered from the substrate in coaxial relation to the housing. Acceleration in the plane of the substrate causes a lateral deflection of the spring, readily producing a momentary contact. The substrate is provided with circuit paths 50, 52 of the switch that are respectively connected to the housing and the spring, thereby defining a normally open electrical contact. Such an arrangement may, by way of example, be located in the heel portion of an athletic shoe.

As indicated above, the illuminated display device constructed in accordance with the present invention may be used to decorate many other types of articles of wearing apparel. One such article, for example, is a baseball cap (not shown) having a transparent or translucent flexible panel member secured to the front face of the cap above the brim. Individualized messages or company logos may be readily formed utilizing the refractive facets in the same manner as described above in connection with the panel member 14 depicted in FIG. 2. Unlike the previously-described embodiment, however, the electrical circuitry associated with such an application need not utilize a motion-sensitive switching means. For example, if the circuitry and power source were provided between the upper and lower surfaces of the brim, a manually operated on-off switch accessible from the underside of the brim may be provided. If desired, circuit 17 may be configured to produce a periodic waveform to periodically illuminate the light emitting element at predetermined intervals.

The illuminated article of the present invention overcomes many of the deficiencies encountered with previously-devised illuminated articles suitable for mounting on articles of wearing apparel in that the decorative, illuminated panel member is flexible and may be caused to conform, as by hand, to any curved or flexible underlying support surface and, when secured to a flexible support surface, the panel member will variously bend and contort therewith. As a result, the panel may be carried and worn on articles of clothing without causing discomfort to the wearer. Moreover, no specially-designed molds need be constructed for complex arcuately contoured surfaces. When positioned on an article of footwear, such as an athletic shoe, the panel member can be positioned at any desired exterior surface location without substantially restricting the bending characteristics of the shoe.

Thus, while there have been shown and described and pointed out fundamental novel features of the invention as applied to illustrative embodiments thereof, it will be understood that various omissions and substitutions and changes in the form and details of the disclosed invention may be made by those killed in the art without departing from the spirit of the invention. It is the intention, therefore, to be limited only as indicated by the scope of the claims appended hereto.

What is claimed is:

1. A decorative, illuminatable assembly securable to an article of wearing apparel having a curved mounting surface at least when the article is worn by a user, said assembly comprising:

a flexible panel member having an upper surface, a lower surface, and a peripheral edge surface between the upper and lower surfaces, said flexible member being sufficiently flexible to substantially conform to the curvature of the mounting surface by hand pressure alone and being substantially comprised of one of a transparent and translucent material through which illumination is passable;

said panel member defining a cavity in communication with and at least partly bounded by said peripheral edge surface and dimensioned and arranged to receive at least one light emitting element operable for emitting illumination into the panel member through said peripheral edge surface; and a decorative pattern of refractive grooves defined in the lower surface of said panel member and dimensioned and arranged to reflect illumination emitted from the light emitting element in said cavity and propagating through said panel member between said upper and lower surfaces.

2. The decorative assembly of claim 1, wherein said panel member further defines at least one reduced thickness portion to facilitate penetration of a needle and thread through said upper and lower surfaces, for affixing the panel member to and atop the mounting surface of the article of wearing apparel upon placement over the mounting surface thereof.

3. The decorative assembly of claim 1, wherein said panel member is comprised of one of poly-vinyl-chloride, poly-(ethylene-co-vinyl acetate) and silicone.

4. The decorative assembly of claim 1, further including at least one light emitting element positioned within said cavity.

5. The decorative assembly of claim 4, wherein said light emitting element has a substantially planar exterior surface and a peripheral edge surface contiguous therewith, the peripheral edge surface of the light emitting element being disposed in confronting opposition to the panel member peripheral edge surface at least partly bounding said cavity for directing emitted illumination from the light emitting element into the panel member along a propagation plane disposed between said upper and lower surfaces.

6. The decorative assembly of claim 4, further including a power source and switching means for electrically interconnecting the power source to said light emitting element.

7. The decorative assembly of claim 6, wherein said switching means comprises an acceleration-sensitive spring switch operative to produce a contact closure between said power source and light emitting element in response to movement of the apparel article.

8. An article of wearing apparel having a decorative, illuminatable assembly secured thereto, comprising:

an article of wearing apparel having a curved mounting surface at least when the article is worn by a user;

a flexible panel member positioned on said mounting surface and having an upper surface, a lower surface disposed in substantial abutment with the article mounting surface, and a peripheral edge surface between the upper and lower surfaces, said flexible member being sufficiently flexible to conform to the curvature of the mounting surface by hand pressure alone and being substantially comprised of one of a transparent and translucent material through which illumination is passable;

said panel member defining a cavity in communication with and at least partly bounded by said peripheral edge surface and dimensioned and arranged to receive at least one light emitting element operable for emitting illumination into the panel member through said peripheral edge surface; and a decorative pattern of refractive grooves defined in the lower surface of said panel member and dimensioned and arranged to reflect illumination emitted from the light emitting element in said cavity and propagating through said panel member between said upper and lower surfaces.

9. The article of claim 8, wherein said panel member further defines at least one reduced thickness portion to facilitate penetration of a needle and thread through said upper and lower surfaces for affixing the panel member to the mounting surface of the article of wearing apparel.

10. The article of claim 8, wherein said panel member is comprised of one of poly-vinyl-chloride, poly(ethylene-co-vinyl acetate) and silicone.

11. The article of claim 8, further including at least one light emitting element positioned within said cavity.

12. The article of claim 11, wherein said light emitting element has a substantially planar exterior surface and a peripheral edge surface contiguous therewith, the peripheral edge surface of the light emitting element being disposed in confronting opposition to the panel member peripheral edge surface at least partly bounding said cavity for directing emitted illumination from the light emitting element into the panel member along a propagation plane disposed between said upper and lower surfaces.

13. The article of claim 11, further including a power source and switching means for electrically interconnecting the power source to said light emitting element.

14. The article of claim 13, wherein said article comprises a shoe, and wherein said switching means comprises an acceleration-sensitive spring switch operative to produce a contact closure between said power source and light emitting element in response to movement of the shoe.

15. The article of claim 13, wherein said article comprises a shoe having an upper and said mounting surface comprises a toe portion of the shoe upper.

16. The article of claim 11, wherein said light emitting element comprises a light emitting diode.

\* \* \* \* \*